W. H. MASON.
GEARLESS POWER TRANSMISSION.
APPLICATION FILED APR. 12, 1917.
1,298,990.  Patented Apr. 1, 1919.
3 SHEETS—SHEET 1.
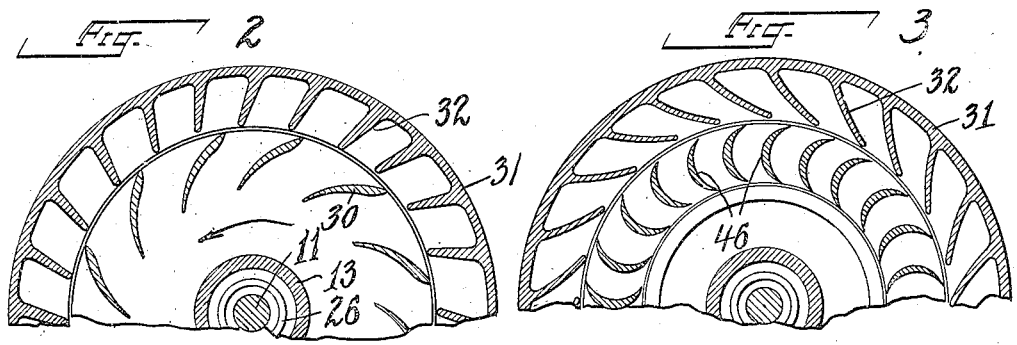
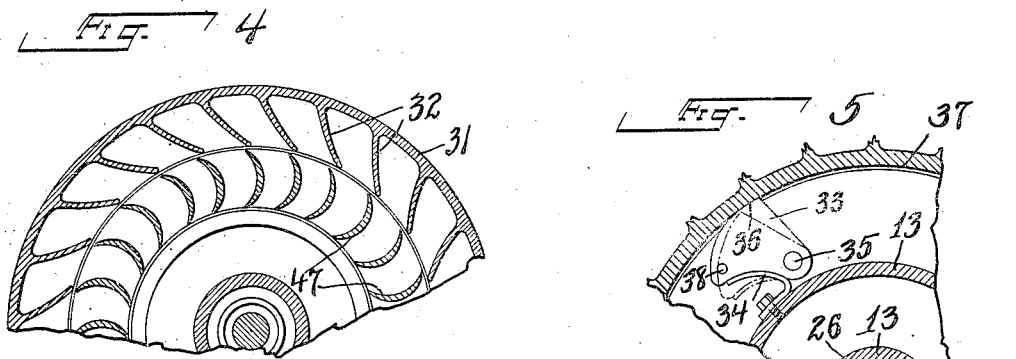
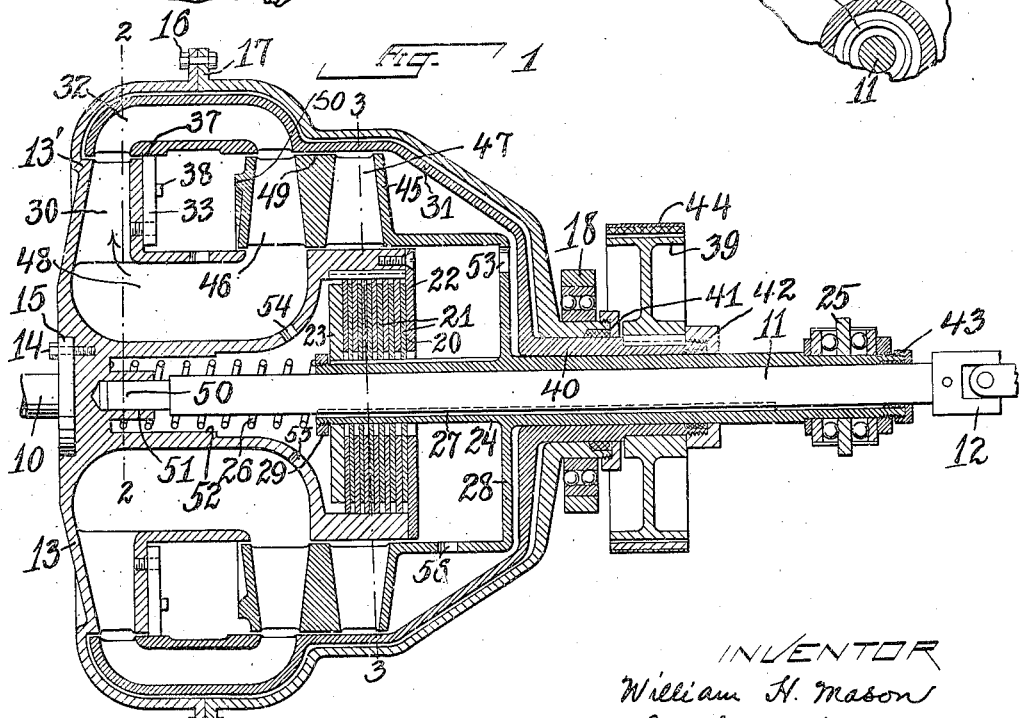

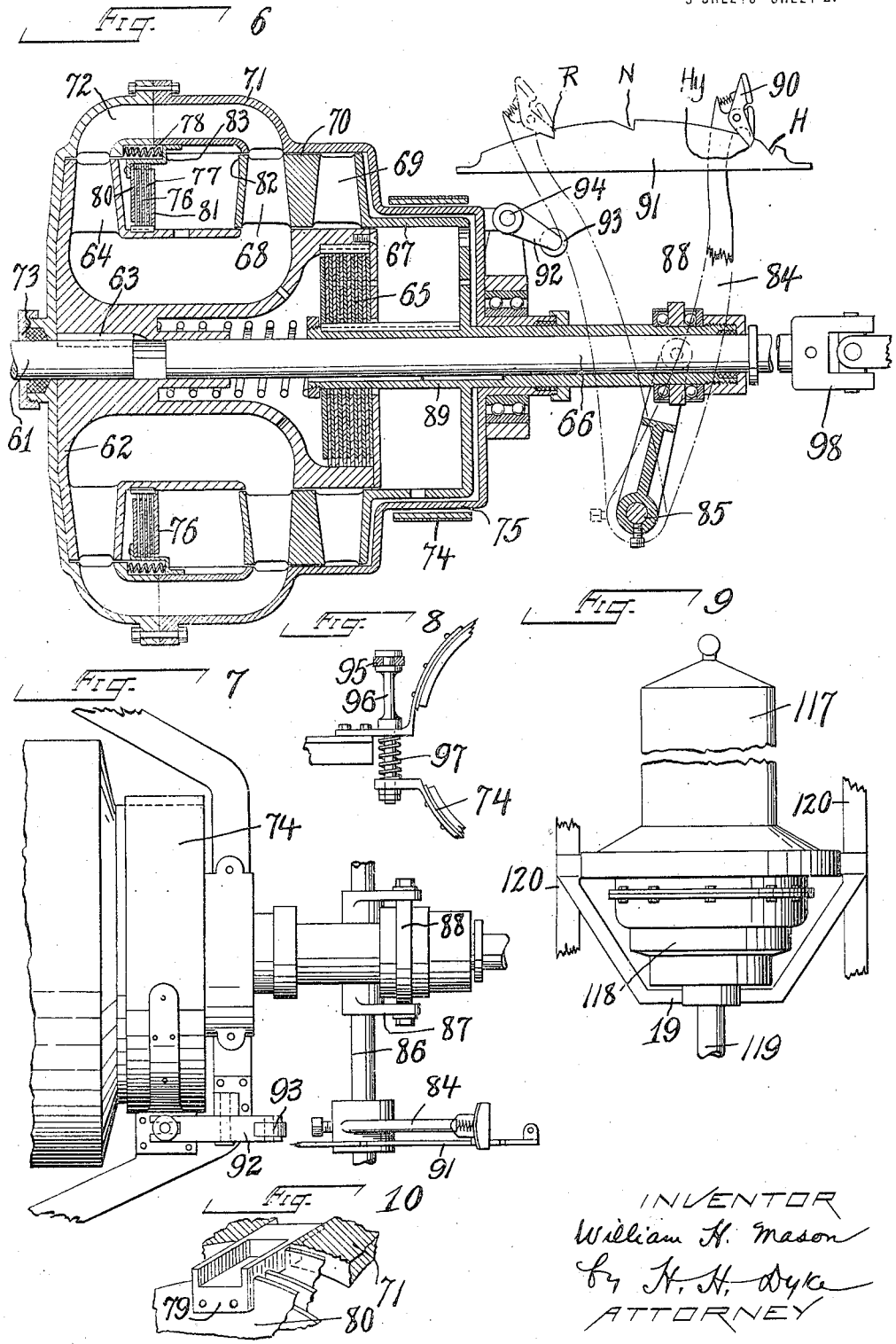

W. H. MASON.
GEARLESS POWER TRANSMISSION.
APPLICATION FILED APR. 12, 1917.
1,298,990.
Patented Apr. 1, 1919.
3 SHEETS—SHEET 3.
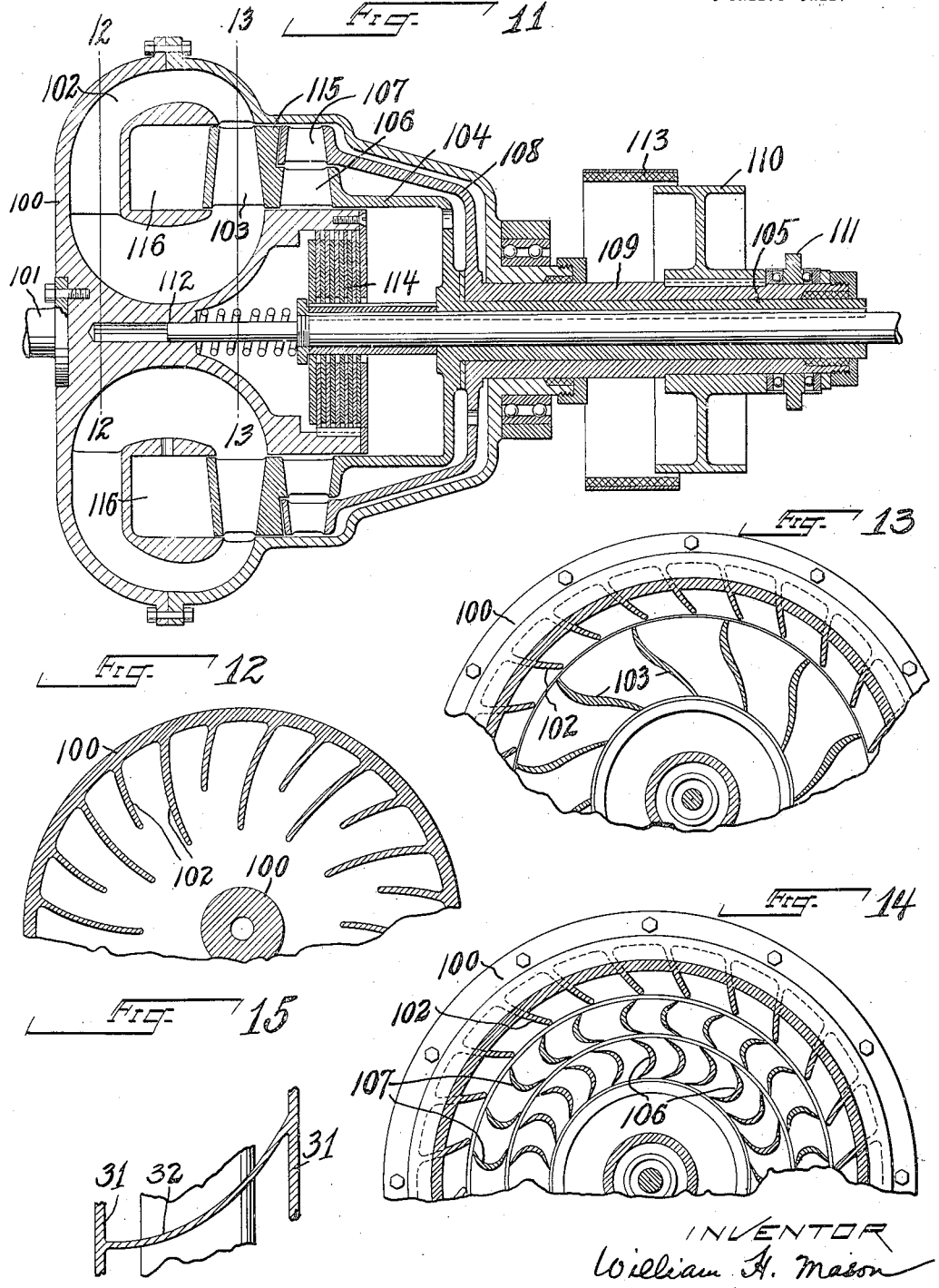

UNITED STATES PATENT OFFICE.

WILLIAM H. MASON, OF SOUTH ORANGE, NEW JERSEY.

GEARLESS POWER TRANSMISSION.

1,298,990.  Specification of Letters Patent.  Patented Apr. 1, 1919.

Application filed April 12, 1917. Serial No. 161,430.

*To all whom it may concern:*

Be it known that I, WILLIAM H. MASON, a citizen of the United States, and a resident of South Orange, county of Essex, and State of New Jersey, have invented certain new and useful Improvements in Gearless Power Transmissions, of which the following is a specification.

My invention relates to gearless power transmissions, and while apparatus in accordance with the invention is particularly adapted for use as an automobile driving means, it may be utilized elsewhere where it is required to rotate one shaft from another and to control their relative speeds or directions of movement, or both. This application is a continuation of my former application for gearless transmission, Serial No. 139,520, filed Dec. 29, 1916.

In the construction shown in my former application a fixed casing was provided in which a body of fluid was rotated. In the present case the casing containing the fluid rotates and, since the casing is rotating when the driving and driven shafts are clutched together, that is to say, in the case of an automobile transmission, when the machine is "in high," there is no occasion for providing means in the present invention for withdrawing the fluid from the casing, a very efficient flywheel effect is obtained, and the casing and contents are efficiently cooled.

In the present case, as in my former application, the hydraulic power transmission is obtained by causing an in and out circulatory flow of fluid in a casing by means of rotating vanes. The part of the apparatus by which the movement of the fluid is secured is herein referred to as the impeller, and the hydraulic drive is obtained by means of a reaction turbine connected to the driven shaft. The reaction turbine in the present application is of the inflow type which is adapted to obtain a high torque, which is desirable as in starting an automobile into motion from standing.

The reverse hydraulic drive is obtained by providing means normally rotative but which are adapted to be held stationary and which have the effect of reversing the action of the fluid so as to rotate a reaction turbine, also connected to the driven shaft, to rotate the same in the opposite direction and by introducing a reaction turbine adapted to be driven in such reverse direction when the flow is subjected to the action of such reversing means. These fluid flow reversing means, as vanes, are preferably part of the impeller means which normally rotate with and form part of the impeller itself but may be held stationary, and are adapted, when so held stationary or substantially stationary, to cause reverse flow of the fluid, but the impeller vanes may be permanently connected together or integral, and the reversing vanes provided separately therefrom, as, for example, the reversing vanes may take up a part of the space normally occupied by the forward reaction turbine, in which case the reaction turbine giving the reverse drive is shortened by so much to make room for the reversing blades so provided, and other means may be resorted to for giving a hydraulic drive whereby the driven shaft is rotated in the opposite direction from the driving shaft. In the case where parts of the impeller vanes or blades are used for securing a reverse drive, means are preferably provided for clutching the impeller parts together so that they may rotate as one, providing a complete impeller for action upon the forward driving turbine, and means are also provided for declutching these parts when the reverse is to be obtained, and also means are provided for holding the same, when declutched, so that they may then act as stationary or substantially stationary vanes.

Means are also provided in accordance with the invention for obtaining a neutral position of the parts whereby the circulation is interrupted, or at least such slight circulation as there may be does not drive either the forward or reverse turbines.

In general the object of the invention is to provide a device of the character referred to which shall be efficient in operation, which may be simply and cheaply constructed, and in the improvement of apparatus of this character in numerous important respects.

Means are provided in accordance with the invention whereby the hydraulic drive may be dispensed with and the driving shaft and driven shaft clutched together and all parts of the transmission rotated together, as a flywheel with entire absence of internal friction and power losses from relatively moving mechanical parts of movement of the contained fluid with respect to the casing or to parts contained therein. In the case of an automobile provided with a transmission in accordance with my invention the greater part of the operation is with the shafts so clutched together and the most effective flywheel action is obtained when it is most needed, as it is with such direct drive that the engine is rotated most slowly with respect to the turning of the drive wheels.

Control means may be provided for my improved transmission, which are extremely simple, it being possible to secure the entire control of the transmission, including hydraulic drive, through speed relations varying substantially infinitely, according to the engine speed and the resistance of the drive wheels, both in forward and reverse directions, direct forward drive with the shafts clutched together, a neutral position, and a braking action, all with easy unclashing transitions from any one to any other of such relations, with a single control means, as, for example, a foot lever spring pressed in one direction and adapted to be pushed in the opposite direction by the foot of the operator, and replacing the usual clutch pedal and gear shift mechanisms now in common use.

Other objects of the invention will be pointed out in the course of the specification, and with the foregoing and related objects in view, my invention consists in the construction, parts, improvements and combinations herein set forth and claimed.

In the accompanying drawings I have illustrated several embodiments of my invention for the purpose of affording a clear understanding thereof, but it is to be understood that such embodiments are illustrated and described merely for the purpose of affording a clear understanding of my invention, and that I am not to be limited thereby, but that my invention is as broad as my claims by which the same is defined.

In said drawings, Figure 1 is a central, longitudinal, cross-sectional view of one form of gearless transmission embodying my invention. Fig. 2 is a cross-sectional detail view taken on the line 2—2, Fig. 1. Fig. 3 is a detail cross-sectional view taken on the line 3—3, Fig. 1. Fig. 4 is a cross-sectional view taken on the same line as Fig. 3 but with the turbine moved into position for reverse driving. Fig. 5 is an enlarged detail view of a clutch illustrated in Fig. 1. Fig. 6 is a view similar to Fig. 1 but showing a modification and also illustrating a form of control mechanism. Fig. 7 is a fragmentary top view of the right hand portion of the construction shown in Fig. 6. Fig. 8 is a detail view of a brake operating means. Fig. 9 is a bottom plan view of an engine and its supports with a transmission such as disclosed in the present application connected thereto to make a unitary power plant. Fig. 10 is a part perspective and part sectional detail view on an enlarged scale of a portion of the left hand clutch shown in Fig. 6. Fig. 11 is a view similar to Figs. 1 and 6 but showing a third modified form of transmission. Fig. 12 is a detail cross-sectional view taken on the line 12—12, Fig. 11, and looking in the direction of the arrow. Fig. 13 is a cross-sectional view taken on the line 13—13, Fig. 11, and looking in the direction of the arrow. Fig. 14 is a cross-sectional view similar to Fig. 13 and taken on the same line, but illustrating the parts in position for reverse driving, and Fig. 15 is a detail sectional view showing one form and arrangement of vanes and applicable to either Fig. 1 or Fig. 6.

Referring to Fig. 1, reference numeral 10 designates the driving shaft which, in the case of a unit power plant arrangement of the transmission, may be an extension of the engine crank shaft, the whole apparatus taking the place of the customary flywheel. 11 is the driven shaft, which may be connected with any device to be driven, as in an automobile it may be connected by a universal joint 12 to transmit power to the drive wheels. 13 is a casing containing fluid, as oil, and secured to and turning with the shaft 10 and may be secured thereto in any desired way, as by bolts 14 passing through a flange 15 on the shaft 10. The casing 13 is preferably parted at substantially the middle of its region of greatest diameter, and the front and rear sections thereof may be secured together in any convenient way, as by bolts 16 passing through flanges 17 provided for this purpose. While the device may be supported entirely from the crank shaft, it is convenient to provide a rear support therefor, as a ball bearing 18, which may be supported in any convenient means arranged for that purpose, as, for example, the cross-member 19 shown in Fig. 9.

The hydraulic transmission means in accordance with the present invention are utilized for obtaining forward driving speeds up to direct drive, direct drive being obtained by clutching the power shaft 10 and the driven shaft 11 directly together so that they turn as one, and also the hydraulic transmission means is designed to provide a reverse. The means for clutching the driving and driven shafts together to obtain direct drive or "high speed," as it is usually termed in automobile practice, may be of any form. In the construction shown in Fig. 1 a plate clutch 20 running in the oil or other fluid contained in the casing 13 is utilized, and comprises a plurality of plates 21 interposed between a plate 22 secured to the member 13 and the plate 23 turning with the sleeve 24 which encircles the shaft 11 and projects outward through the casing 13 and may be moved endwise, as by means of a thrust collar 25 which may be actuated by any convenient means of control, as, for example, that illustrated in Fig. 6 and which will hereafter be described. A spring, as the coil spring 26 serves to normally hold the plates 22 and 23 toward one another, whereby the clutch plates, being alternately secured to the sleeve 24 and to the member 13, serve to clutch the two shafts 10 and 11 together and to obtain the direct drive from the shaft 10 to the shaft 11 with the smooth, easy transition from one relation to another, which is characteristic of this form of clutch. The sleeve 24 is splined to the shaft 11, as by means of the key 27. This sleeve 24 has formed thereon or secured thereto the extension 28 which carries the reaction turbine or turbines, and which will be referred to more at length hereafter. Clearance is provided between the plate 22 and the extension 28 to permit the longitudinal movement of the sleeve 24 when actuated by the control member 25.

It should be noted in the construction illustrated in Fig. 1 the parts are shown in position for forward hydraulic drive, and for the direct clutched high speed relation the spring 26 is permitted to expand slightly farther than as shown, bringing the nut 29 firmly against the plate 23, whereby the clutch members are held closely together and the clutch becomes operative to secure the clutched together movement of the shafts 10 and 11, the control member 25 being permitted to move slightly toward the right from the position shown to secure such direct drive relation. The member 13 is provided with impeller blades which rotate therewith, and by action on the fluid with which the rotating housing 13 is filled or substantially filled, drives the same outward. In the form shown the impeller blades are designated by the numeral 30 and are preferably of the form shown in cross-section in Fig. 2, the rotation of the casing 13 being in the direction shown by the arrow on said figure.

In the neighborhood of the periphery of the member 13 an inner shell 31 is provided, preferably fitting substantially closely within the member 13 and having vanes 32 providing passages for the fluid therebetween. The member 13 may be offset, as shown at 13', so as to receive the wall of the member 31 in the offset and to make the passages between the vanes 32 a smooth continuation of the passages between the vanes 30. The preferred form of the vanes 32 in these passages is shown clearly in Figs. 2, 3, 4 and 15, and for forward hydraulic drive the member 31 is clutched to the member 13 so as to rotate therewith, the passages between the vanes 30 and 32 forming substantially one continuous passage. In the form shown in Fig. 1, the means for clutching the parts 13 and 31 together have the form of toggle clutch pieces 33, which are actuated by springs 34 to turn them on their pivots 35 so as to bring their clutch faces 36 into contact with a shoe 37 of the member 31, the toggle pieces 33 being so inclined relative to the direction of rotation as that once engaged with the shoe piece 37 they are held in strong engagement therewith by the combined action of the springs 34 and of the rotating parts, as will be clear from the showing in Fig. 5.

Means are provided for releasing the clutching action between the parts 13 and 31, and with the toggle clutch pieces 33 shown, the projecting pins 38 are provided for this purpose by coacting with a part presently to be described.

The member 31 is held stationary or substantially stationary in order to obtain the reverse actuation of the driven shaft 11, and the means provided for that purpose may consist of a brake wheel 39 secured to the sleeve 40, which is an extension of the member 31 and fits about the sleeve 24 already referred to and within the member 10. Where the various parts project from the casing, suitable packing devices to prevent the loss of oil are preferably provided, and in the construction shown one such packing device for preventing leakage about the casing 13 is shown at 41, and another for the sleeve 40 at 42, the packing nut in this case being also preferably utilized as a means to assist in clamping the brake wheel 39 in place, and a third packing piece 43 may be provided to prevent the loss of fluid about the shaft 11. Any means may be resorted to for holding the member 31. In the form shown a brake band 44, adapted to be clamped on the wheel 39 by any suitable mechanism, such, for example, as the means illustrated in Fig. 6, is made use of for this purpose.

The sleeve 24 and extension 28 thereon carries the turbine member 45, and the same is provided with vanes 46 for the forward hydraulic drive and with vanes 47 for the reverse drive. The passages between the vanes 46 are preferably flared toward the center of the structure where their width is least by reason of the radial approach of the vanes, and are preferably so designed as to have a substantially uniform cross-section throughout their length. The form of these blades is such as is adapted for efficient actuation by the fluid passing therethrough, and they may have the form illustrated in Fig. 3, or other forms adapted to serve such purpose. In the drawing the same number of vanes 46 and 32 are shown, but preferably the number is slightly different in order to avoid synchronic registration therebetween. The passages between the vanes 32 and 46, together with the interior passage 48, here shown as without vanes, though it may be provided with vanes if desired, make up the complete passage for the circulatory movement of the fluid. As already stated, when the turbine member 45 is in the position shown in Fig. 1, the shafts 10 and 11 are not clutched together by the clutch 20, and with the parts so related forward drive is obtained, the vanes 30 and 32 serving to set up a circulatory movement of the fluid which, by passage through the vanes 46 of the turbine 45, causes the turbine to move in the same direction as the member 13 and with an expenditure of power upon the vanes 46, which is dependent upon the rate of movement of the turbine to which they are secured, so that, as upon starting an automobile forward, a very considerable torque is obtained, and as the turbine 45 and the drive wheels driven therefrom pick up speed, the speed of the turbine tends to approach the speed of the member 13. In this way the driven elements may be gradually brought up by the hydraulic driving means to a situation in which the shafts 10 and 11 are rotating at about the same speed, whereupon the member 25 may be moved to the right and the clutch 20 engaged and the direct driving relation secured, all the parts then turning together as a simple flywheel.

The turbine 45 also has vanes 47 serving to obtain a reverse action of the turbine and therefore of the shaft 11 connected thereto. To secure such action, means are provided for moving the turbine so as to bring the vanes 47 into the circulatory channel in the place occupied by the vanes 46 in Fig. 1, and the member 31 is released from rotation with the member 13 and held stationary or substantially so, so that the vanes 32 therein become substantially stationary and fixed and serve to direct the flow of the liquid backward, as will be clear from Fig. 15, so as to obtain an efficient reversing action by its delivery therefrom to the reverse vanes or blades 47. These various effects may be secured in a variety of ways. In the form shown, the member 13 is provided with the toggle members 33 opposite the turbine 45, and the forward end of the turbine 45 is provided with an annular notched out portion 50 which serves, upon movement toward the toggles 33, to act substantially as a cam and to pull the pins 38 inward slightly to the dotted line position of Fig. 5, thus releasing the members 33 from their clutched relation to the rotating member 13 and permitting the member 31 to be held from rotating. It may then be held stationary, as already stated, by any means, such as by clamping the brake band 44 upon the brake wheel 39. When the parts are so related, the reverse movement is obtained, the passage of liquid being through the channels between the rotating vanes 30, stationary vanes 32, and reverse turbine vanes 47, the rotating members 30 serving to secure circulation of the fluid, the vanes 32 being fixed and directing the fluid so as to obtain reverse movement, and the turbine vanes 47, with the shaft 11 secured thereto, turning in a reverse direction.

Between the vanes 46 and 47 the turbine 45 has a blank section 49 with a smooth periphery which, upon being brought opposite the discharge ends of the passages between the vanes 32, shuts off the circulation so that a neutral position is obtained.

It will be observed that in the form of construction shown in Fig. 1, the shaft 11 need not be moved endwise, the only part having endwise movement being the sleeve 24 and the turbine members carried thereby. The end 50 of the shaft 11 is provided with a socket bearing 51 in the member 13 whereby accurate alinement and the steadying of all the parts as they rotate is obtained, and in this form a recess 52 is provided in the member 13 for the reception of the clutch spring 26.

The operation of the device shown in Fig. 1 will be readily understood from the foregoing. With the parts in substantially the position shown, the shaft 10 being rotated rotates the shell 13 attached thereto, and the impeller vanes or blades 30 and 32 moving together cause a circulation of the fluid contents, which actuates the turbine through the plates 46 and causes the shaft 11 to move, its speed being increased relative to that of the shaft 10 as the operation continues, and giving all driving effects, from starting up to a drive approximately direct drive, by the smooth hydraulic action of the fluid circulated by the impeller and passing through the reaction turbine. If the control member is moved to the right, the direct clutched relation is obtained. For reverse, the control member 25 is moved to the left, bringing the vanes 46 out of the circulatory region and bringing the reverse vanes 47 into such region of circulation, and, as already stated, the clutch members 33 are released and the member 31 and the vanes 32 held stationary, whereupon the rotation of the shaft 11 is first retarded, giving a braking action, and may be reversed with respect to the shaft 10. Intermediate between forward hydraulic drive and reverse, a neutral position is obtained with the blank wall 49 blocking the circulation channel.

Means for permitting the fluid to move to occupy different positions in the casing as the parts are moved from one position to another are provided, as, for example, the openings 53 in the plate 28, the openings 54 and 55 in the inner portion of the member 13, and the opening 56 in the horizontal portion of the turbine member. Other means of communication, so as to enable the fluid to move and take up its proper position as the parts of the device are shifted, may be resorted to.

In the form shown in Fig. 6, the power shaft 61 has the member 62 secured thereto to turn therewith, as by means of a key 63, and is provided with impeller blades 64. The clutch 65 serves to give direct driving connection between the power shaft 61 and the driven shaft 66 substantially as before, and the turbine member 67 is splined on the shaft 66 so as to have endwise movement relative thereto, but the two parts always turn together. The turbine member has vanes or blades 68 for forward hydraulic driving and vanes or blades 69 for reverse hydraulic driving, the intermediate closed space 70 serving to provide a neutral position between the two positions for forward hydraulic drive and reverse drive. The shell 71 carries the vanes 72, which are turned backward at an angle, as in the case of the vane construction shown in Fig. 1. The construction shown in Fig. 6 differs from the construction shown in Fig. 1, among other things, by the fact that the outer shell is not constantly rotating with the shaft 61, but the outer shell 71, taking substantially the place of the member 31 in Fig. 1. is continued all around the impeller member 62 and has a gland 73 to prevent leakage of oil or other fluid contained in the apparatus about the drive shaft 61. This member 71 may be held stationary for the reverse, as by means of a brake band 74 encircling and adapted to hold a portion 75 of the shell 71. In this form shown in Fig. 6, I have illustrated a plate clutch instead of the toggle clutch members 33 of Fig. 1, the same being operated by the turbine member at the limit of its movement, as before. This clutch, designated generally by the numeral 76, comprises plate 77 keyed, respectively, to the interior impeller member 62 and to the outer member or shell 71, and normally held in clutched relation, so that the parts 62 and 71 move together, by means of springs 78 which are received in slotted members 79 shown in perspective in Fig. 10 and serving to hold the plate 80 on the shell 71 toward the plate 81 on the member 62. At the limit of its movement the turbine member 67 has the portion 82 thereof in contact with the coacting portions 83 of the members 79, and being pushed against the portions 83 thereof causes the member 79 to move in such direction as to compress the springs 76 and to increase the distance between the plates 77 and 80, thereby freeing the clutched plates from frictional contact and permitting relative movement of the members 62 and 71, and in particular permitting the member 71 to be held stationary while the member 62 continues to rotate.

Various forms of control devices may be resorted to for securing the proper actuation and control of the various elements, and in Fig. 6 I have shown one such form of control which is illustrative of the variety of control means which may be utilized for securing proper operation of the parts. The form illustrated is simple, consisting only, so far as the operator is concerned, of a pedal and a locking lever therefor, and in the case of automobile transmission such control means afford a very easy and simple operating device for the transmission, which may be entirely controlled by a single pedal and its locking means, and in fact, the locking means may be dispensed with, but the same are preferably provided because of the convenience afforded thereby. The pedal lever is illustrated at 84 and is pivoted at 85 in any conveniently located frame member or the like, and its pivot shaft 86 carries a yoke 87 adapted to move the control collar 88, whereby as the pedal is operated the sleeve 89, carrying the turbine members, is moved back and forth in the apparatus. The locking lever 90 is illustrated as adapted to lock into notches in a segment 91 provided for that purpose, and in the form shown the segment 91 is provided with four notches which are marked, respectively, R, N, Hy and H. The notch marked Hy is the position for the forward hydraulic drive, the clutch 65 being free and the transmission of power from the shaft 61 to the shaft 66 being through the hydraulic drive, the turbine being actuated by the action of the circulating liquid on the vanes 68. When the pedal 84 is moved so that the locking lever 90 engages the notch N, the turbine member is moved so that the blank space 70 is opposite the discharge of the vanes 72 so that no power is transmitted to the driven shaft 66 and a neutral position is obtained. Upon moving the lever 84 over, so that the locking member 90 may engage the notch R, the reverse turbine blades 69 are moved into registration with the vanes 72, and at the same time or thereabouts the band 74 is clamped on the brake surface 75. In the form shown this result is obtained by means of a lever 92 having a roller 93 engaged by the lever 84 and pivoted at 94 and having its opposite end connected at 95 to a rod 96 on one end of the brake band 74, a spring 97 being interposed to hold the brake out of engagement unless forcibly held in engagement through the lever 93. In this form too the driven shaft 66 need not be moved lengthwise, which conduces, in the case of an automobile drive, to the use of a simple form of universal joint 98.

The form illustrated in Fig. 11 resembles that shown in Fig. 1, in that the impeller member 100 is attached to the driving shaft 101 and turns at all times therewith, but in this form the impeller blades 102 continue uninterruptedly all the way around and discharge against the vanes 103 giving the forward hydraulic drive, the turbine member 104, of which they form a part, being extended out as a sleeve 105 to the outside of the device. The operation for forward hydraulic drive is substantially the same as in the forms already discussed, in which such hydraulic drive was obtained by all the vanes leading to the forward drive turbine blades being rotated together, but in this case the blades are permanently secured together instead of being only clutched together. In the form shown in Fig. 11 the reverse turbine blades 106 are preferably made shorter than before, and provision is made in the space secured thereby for directing the moving fluid so as to actuate the reverse turbine. Such reversing blades are shown at 107 and are fixed to a member 108 extending out through the casing in the form of a sleeve 109 and having secured thereto a brake wheel 110 by which the sleeve 109 and vanes 107 may be held stationary. Except when so held stationary, such vanes 107 and the member 108, to which they are attached, are free to rotate. This member 108 moves in and out with the turbine member 104, and in the form shown, the actuating means for producing the in and out movement are secured to the sleeve 109, and such control means are indicated at 111, the sleeves 109 and 105 being arranged so as to rotate freely with respect to one another, but so as that they are not movable lengthwise relative to one another, and the inner sleeve 105 carrying the turbine being keyed on the driven shaft which, in this case, moves in and out with the control means and has a long socket joint 112 in the member 100 to permit such in and out movement. A brake shoe 113 is provided to clamp the brake wheel 110 when moved into alinement therewith.

The operation of the device shown in Figs. 11 to 14 is as follows: With the control member 110 in the position farthest to the right, direct drive is obtained through the clutch 114. Movement slightly to the left disengages this clutch, and in the position shown in the drawing, the drive is through the hydraulic means, being exerted on the vanes 103 in the same manner as in the other cases. Upon movement of the control member farther to the left, the blank space 115 comes opposite the discharge of the vanes 102, affording a neutral position, and upon further movement of the control member 111 to the left, the reversing vanes 107 and the reverse turbine blades 106 come opposite the discharge of the impeller vanes 102, the forward end of the turbine being received in the blank space 116 provided therefor in the member 100 which, in this form, does not contain a clutch as in the other forms shown.

By means suitably adapted for the purpose, as, for example, the control members shown in Fig. 6, the brake wheel 110, when moved to the position corresponding to the reverse position of the vanes, is clamped by the brake shoe 113 so as to prevent its rotation and to hold the member 108 and the reversing vanes 107 stationary. This moves the various parts into the relation shown in Fig. 14, wherein the fluid is directed by the reversing vanes 107, and the driven shaft is caused to rotate in a backward direction by the fluid delivery through the reversing vanes 107 to the reverse turbine blades 106. In this case it will be noted, as in Fig. 1, the exterior shell of the casing is constantly rotated with the driving shaft, and the portion held stationary for the reverse is within the casing.

Fig. 9 shows, in a diagrammatic fashion, the appearance of the ordinary form of hydrocarbon engine used in an automobile with a transmission in accordance with my invention directly connected thereto to form a unitary power plant, the engine itself being indicated at 117 and the exterior of the transmission at 118 and the driven shaft at 119. 120, 120 designates supporting members, as the side frame members of an automobile chassis.

Having thus described my invention, I claim:

1. In a gearless power transmission, a rotary casing having fluid impelling means therein, a turbine in said casing having reaction forward drive means and reaction reverse drive means, said turbine being movable in said casing, and control means for moving the turbine from the exterior of the casing.

2. In a gearless power transmission, a rotary casing, fluid impelling means rotating with said casing, and a pair of oppositely actuable reaction turbines within said casing.

3. In a gearless power transmission, a rotary casing, fluid impelling means rotating with said casing, a driven shaft projecting out from within said casing, and oppositely actuable fluid turbines secured to said shaft within the casing.

4. In a gearless power transmission, a rotary casing, fluid impelling means rotating with said casing, a member within said casing and adapted to be clutched thereto and forming a continuation of said fluid impelling means, and a reaction fluid turbine within said casing.

5. In a gearless power transmission, a rotatable casing, fluid impelling means rotating with the casing, vanes in said casing adapted to be rotated with the casing or to be held stationary, and means on the exterior of the casing for holding said vanes stationary.

6. In a gearless power transmission, a rotary casing, fluid impelling means rotating with said casing, means for stopping the rotation of a part of said fluid impelling means, said part when prevented from rotating being adapted to form stationary vanes.

7. In a gearless power transmission, a rotary casing, fluid impelling means rotating with said casing, means for stopping the rotation of a part of said fluid impelling means, said part when prevented from rotating being adapted to form stationary vanes, a reaction turbine in said casing and adapted to be driven by the impelled fluid when the impeller parts rotate together, and a second reaction turbine in said casing and adapted to be driven reversely when the said vanes are held stationary.

8. Power transmitting means comprising a rotary fluid impeller having vanes backwardly inclined with respect to their direction of rotation, said vanes being divided into inner and outer parts, and means for holding the outer portion of said vanes stationary.

9. Power transmitting means comprising a rotary fluid impeller having vanes backwardly inclined with respect to their direction of rotation, said vanes being divided into inner and outer parts, means for clutching the outer parts to the inner parts, and means for holding the outer parts of said vanes stationary when declutched from the inner portion thereof.

10. Power transmitting means comprising a rotary fluid impeller having vanes backwardly inclined with respect to their direction of rotation, a reaction turbine adapted to be driven by fluid impelled by the impeller means for holding the outer portions of said vanes stationary, and a reversely actuable reaction turbine for coaction with said vanes when held stationary.

11. Power transmitting means comprising a rotary fluid impeller made up of outer and inner parts, means for clutching the two parts together, means for holding the outer parts stationary when declutched from the inner parts, a forward drive reaction turbine adapted to coöperate with said vanes when clutched together, and a reverse drive reaction turbine adapted to coöperate with said vanes when the outer vanes are held stationary.

12. Rotary power transmitting means comprising impeller vanes inclined backwardly with respect to the direction of their rotation, the same being made up of inner radial vanes and outer separate arcuate vanes adapted to be clutched to and declutched from the radial vanes, a forward drive turbine adapted to coöperate with said impeller when the parts thereof are clutched together, and a reverse drive turbine adapted to coöperate with said impeller when said arcuate vanes are held stationary.

13. In a gearless power transmission, a rotary casing, fluid impelling means within said casing, a part of said impelling means being secured thereto and part being separable therefrom, and a reaction turbine in said casing in the path of travel of the impelled fluid.

14. In a gearless power transmission, a rotary casing, and fluid impelling means in said casing, said impelling means being in two parts, one permanently connected to said casing and the other being adapted to be clutched thereto and released therefrom.

15. In a gearless power transmission, a rotary casing, and means in said casing and arranged at substantially the periphery thereof for acting as a fluid impelling means and adapted to be held stationary and to act as a flow reversing means.

16. In a gearless power transmission, a rotary casing having a substantially annular circulatory passage therein, vanes in said casing adapted to cause circulation of the fluid in said channel, and a reaction turbine in said annular channel.

17. In a gearless power transmission, a rotary casing having a substantially annular passage for fluid circulation, said passage containing vanes at one side thereof attached to the rotary casing, and a reaction turbine rotatable with respect to said casing at the opposite side of said annular passage.

18. In a gearless power transmission, a driven shaft and a driving shaft, rotating hydraulic means whereby the driving shaft may be driven at a different speed from the driven shaft, and a friction clutch for clutching the driving and driven shafts together, the hydraulic drive means serving as a flywheel.

19. In a gearless power transmission, a driving shaft, a casing rotating therewith, a driven shaft, hydraulic drive means in the casing whereby the driven shaft is hydraulically driven, and a friction clutch for clutching the driving and driven shafts together whereby the shafts, casing and contents rotate in unison.

20. In a gearless power transmission, a driving shaft, a casing rotating therewith, a driven shaft, forward and reverse hydraulic driving means in said casing, and means in the casing for clutching the driving and driven shafts together so that they rotate in unison.

21. In a gearless power transmission, a driving shaft, a casing rotating therewith, said casing being of greatest diameter toward one end and of reduced diameter toward the opposite end, hydraulic power transmitting means in the part of largest diameter, and a direct drive clutch in the part of reduced diameter.

22. In a gearless power transmission, a driving shaft, a casing rotating therewith, said casing being of greatest diameter toward one end and of reduced diameter toward the opposite end, a driven shaft extending through the end of smallest diameter, hydraulic power transmitting means in the part of largest diameter, a direct drive clutch in the part of reduced diameter, and means extending out about the driven shaft whereby the power transmitting means may be controlled.

23. In a gearless power transmission, a rotary casing, fluid impelling means in said casing, vanes normally adapted to rotate with said casing and to assist in fluid impelling, means adapted to hold said last named vanes stationary, and a reaction turbine having forward and reverse vanes, the forward vanes being adapted to be operated when the entire fluid impelling surface is in action and to be operated in reverse direction when the first named vanes are held stationary.

In testimony that I claim the foregoing I have hereto set my hand this 10th day of April, 1917.

WILLIAM H. MASON.